United States Patent [19]
Ramer et al.

[11] Patent Number: 6,007,225
[45] Date of Patent: Dec. 28, 1999

[54] DIRECTED LIGHTING SYSTEM UTILIZING A CONICAL LIGHT DEFLECTOR

[75] Inventors: David P. Ramer, Reston; Albert Green, Alexandria; E. Alan Phillips, Great Falls; Jack C. Rains, Jr., Herndon, all of Va.; John F. Reim, Potomac, Md.

[73] Assignee: Advanced Optical Technologies, L.L.C., Chevy Chase, Md.

[21] Appl. No.: 09/034,760

[22] Filed: Mar. 4, 1998

Related U.S. Application Data

[60] Provisional application No. 60/062,238, Oct. 16, 1997.

[51] Int. Cl.$^6$ .................................. F21V 7/04; F21V 8/00
[52] U.S. Cl. ..................... 362/554; 362/304; 362/551; 362/346
[58] Field of Search ...................... 362/551, 554, 362/576, 581, 304, 346; 385/43, 146, 901

[56] References Cited

U.S. PATENT DOCUMENTS

| | | | |
|---|---|---|---|
| 3,234,559 | 2/1966 | Bartholoma et al. ............. | 385/43 |
| 3,932,023 | 1/1976 | Humer .......................... | 385/35 |
| 4,463,410 | 7/1984 | Mori ............................ | 362/20 |
| 4,735,495 | 4/1988 | Henkes .......................... | 349/62 |
| 4,995,727 | 2/1991 | Kawagoe et al. ................. | 356/402 |
| 5,315,490 | 5/1994 | Bastable ....................... | 362/558 |
| 5,335,158 | 8/1994 | Kaplan et al. .................. | 362/303 |
| 5,438,495 | 8/1995 | Ahlen et al. ................... | 362/153.1 |
| 5,459,645 | 10/1995 | Sattler et al. ................. | 362/558 |
| 5,486,984 | 1/1996 | Miller .......................... | 362/560 |
| 5,575,551 | 11/1996 | Horii ........................... | 362/554 |
| 5,629,996 | 5/1997 | Rizkin et al. .................. | 362/551 |
| 5,676,446 | 10/1997 | Gold ............................ | 362/552 |
| 5,692,091 | 11/1997 | Cassarly et al. ................ | 385/146 |
| 5,727,108 | 3/1998 | Hed ............................. | 385/133 |
| 5,730,519 | 3/1998 | Okuchi et al. .................. | 362/559 |
| 5,835,648 | 11/1998 | Narciso, Jr. et al. ............ | 385/31 |

FOREIGN PATENT DOCUMENTS

| | | | |
|---|---|---|---|
| 787.117 | 9/1935 | France . | |
| 787117 | 9/1935 | France ......................... | 362/551 |

*Primary Examiner*—Alan Cariaso
*Attorney, Agent, or Firm*—McDermott, Will & Emery

[57] ABSTRACT

A conical deflector receives light from a source through an opening at the narrow end of the cone. In one embodiment, an optical fiber bundle supplies light directly into the cone. In another embodiment, the conical deflector receives light via an optical integrating cavity. A substantial portion of the inner surface of the cones has a specular reflectivity. The entire surface may be uniformly specular (e.g., highly specular). Alternatively, one or more sections of the inner walls of the cone may have a diffuse reflectivity or a different degree of specular reflectivity (e.g., quasi-specular). The deflector is dimensioned relative to a narrow, desired field of view and the light source to deflect light that would otherwise pass out of the desired field of view, so as to efficiently illuminate the desired field of view. The conical deflector provides a substantially uniform light intensity distribution over the desired field of view.

30 Claims, 8 Drawing Sheets

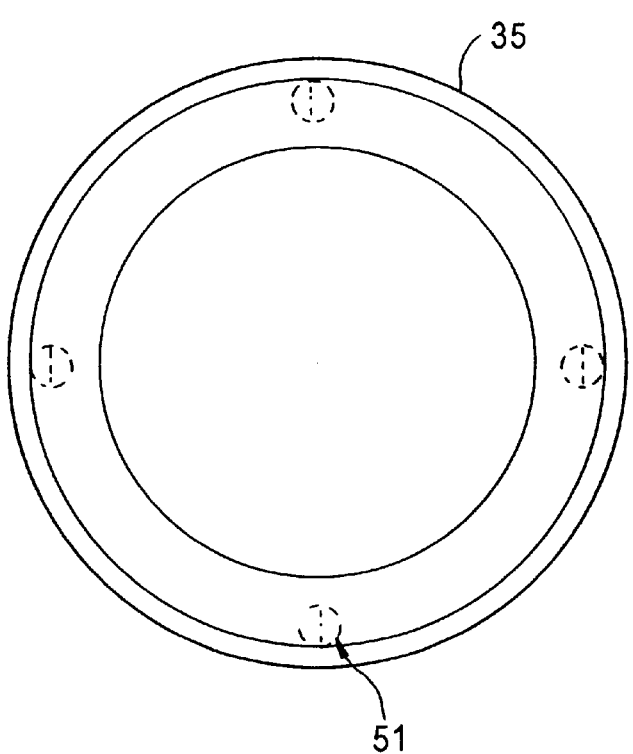
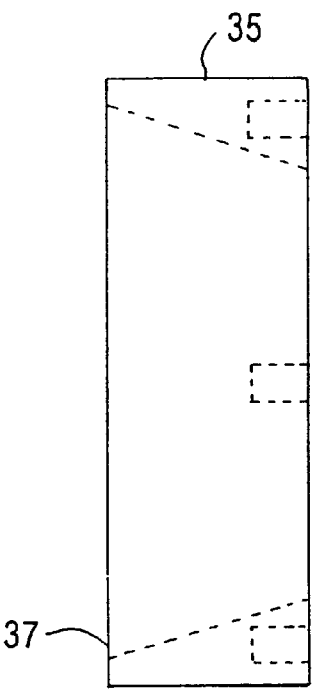
FIG. 5A
FIG. 5B
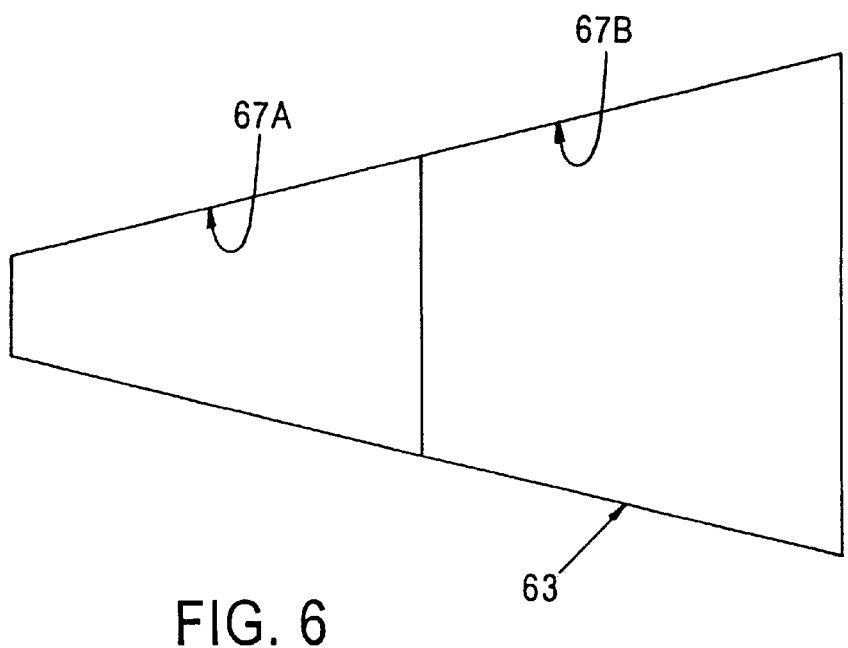
FIG. 6

DIRECTED LIGHTING SYSTEM UTILIZING A CONICAL LIGHT DEFLECTOR

PRIORITY CLAIM

This application claims the benefit of U.S. Provisional Application Ser. No. 60/062,238 filed Oct. 16, 1997, the disclosure of which is incorporated entirely herein by reference.

TECHNICAL FIELD

The present invention relates to a lighting system utilizing a conical light deflector, to provide efficient lighting over a narrow field of view.

BACKGROUND

Directed lighting fixtures traditionally use a light source and a contoured reflective surface to distribute light over a desired pattern or area. If the light source is an incandescent bulb, the bulb may have a diffuse emission pattern, and be positioned at the focal point of a reflector. The reflector directs the light to the desired field of view. Bulbs also have been developed that include internal reflectors to produce spotlight type distribution patterns.

Increasingly, there are a number of lighting applications which require a narrow field of view. A wide variety of reflector structures have been considered for limiting the field of view, but the efficiency of the light distribution produced by the known structures has generally been limited. A traditional source and parabolic reflector actually focuses the emitted light, producing a concentration of the light in a small area within the field of view at a given distance from the lighting fixture. Also, many reflector designs concentrate a substantial portion of the light in the field of view, but allow some portion of the light to escape the desired field, thus limiting the lighting efficiency within the desired field of view.

Recently, interest also has focused on development of lighting systems utilizing optical fibers. Optical fibers allow transport of light from a source to a desired location and direction of the light from an end of the fiber. The emission pattern from most such fiber systems generally produces a pool of light from one or more fibers. Such fiber lighting systems do not provide a narrow field of view with a uniform distribution within the designated field of view.

A need therefore exists for a lighting system which will provide efficient directed lighting, e.g. with a uniform intensity distribution, over a relatively narrow field of view. A need also exists to provide such a lighting system for use with an optical fiber type light source. Disclosure of the Invention The present invention addresses the above stated needs and provides an advance over the art by utilizing a conical deflector. The deflector, for example, may have the shape of a circular cone, but the cone is truncated to have an opening at its narrow end (rather than a point). The deflector is dimensioned relative to the narrow field of view and the light source to deflect light that would otherwise pass out of the desired field of view so as to illuminate the desired field of view. Virtually all of the emitted light illuminates the desired field of view, resulting in a high efficiency of illumination within that field. Also, the conical deflector provides a substantially uniform light intensity distribution over the desired field of view.

In one preferred embodiment, the opening of the narrow end of the conical deflector is coupled to the light emitting end of one or more optical fibers. The angle of the cone of the deflector corresponds to the desired angle of the field of view. The inner surface of the deflector has a specular reflective characteristic over a substantial area thereof. The degree of specular reflectivity may vary over the length of the conical deflector.

Alternate embodiments utilize a combination of one or more of the conical deflectors with a source and an integrating cavity. The narrow end of each cone is coupled to an opening through the wall of the integrating cavity. The light emerging from the cavity includes substantially all of the light emitted from the source. The one or more conical deflectors direct that light uniformly over the desired field of view. In this embodiment, the source may be a lamp or the like within the cavity, or the source may be the light emitting end of one or more optical fibers.

In an embodiment with a single cone coupled to the cavity, the integrating cavity preferably is spherical, with a diffusely reflective surface. In another embodiment with several conical deflectors, the integrating cavity is cylindrical. Other cavity shapes also may be used. In each case, the inner surface(s) of the cavity have a highly diffuse reflective characteristic.

The invention also encompasses a number of techniques to further improve uniformity within the field of view produced by the conical deflector in the basic embodiments discussed above. One approach is to use two or more different types of reflectivity in different sections along the interior surface of the cone. For example, a section of the cone beginning adjacent the opening in the small end of the cone and extending lengthwise to approximately the middle of the cone may have either a diffuse reflectivity or a quasi-specular reflectivity. The rest of the inner cone surface, extending from the middle to the large end of the cone, would have the highly specular reflective characteristic.

The invention also encompasses techniques to produce a desired shape of the field of view of the source and deflector system. The exemplary cone discussed above, having a circular cross-section, typically has a circular field of illumination. Cones having different cross-sectional shapes, for example oval, elliptical, triangular, rectangular or semi-circular (with a flat side) produce correspondingly shaped fields of view for illumination by the source and deflector system. Also, non-circular components sometimes give better performance than circular components.

Additional objects, advantages and novel features of the invention will be set forth in part in the description which follows, and in part will because apparent to those skilled in the art upon examination of the following or may be learned by practice of the invention.

BRIEF DESCRIPTION OF DRAWINGS

The drawing figures depict the present invention by way of example, not by way of limitations. In the figures, like reference numerals refer to the same or similar elements.

FIGS. 5A and 5B are end and side elevational views respectively of the cone retainer plate of the optic of FIG. 3.

FIG. 6 is a simplified cross-sectional illustration of a conical deflector, wherein two sections of its interior surface have different light reflective characteristics.

PREFERRED EMBODIMENTS OF THE INVENTION

Lighting fixtures in accord with the present invention utilize one or more conical deflectors having a specular reflective inner surface, to efficiently direct most of the light emerging from a light source into a relatively narrow field of view.

Figure 1A:
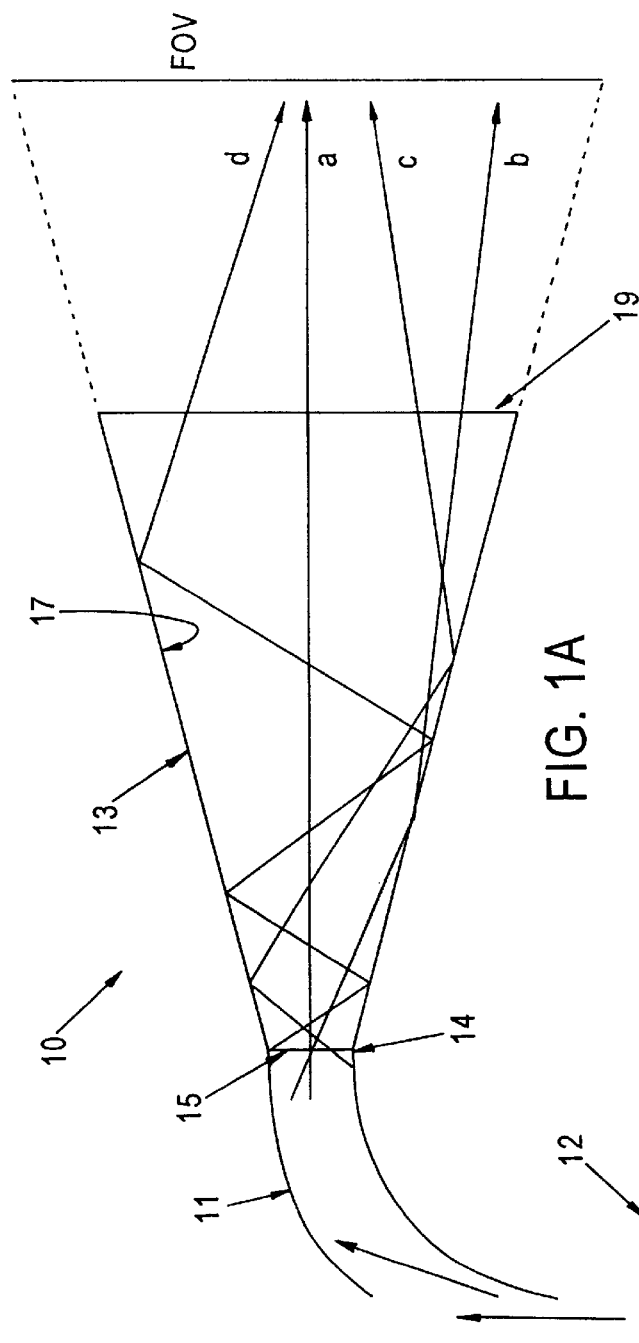
FIG. 1A is a simplified cross-sectional illustration of a conical deflector utilized with an optical fiber and light source to uniformly direct the light from a fiber optic bundle into a narrow field of view.
Figure 1B:
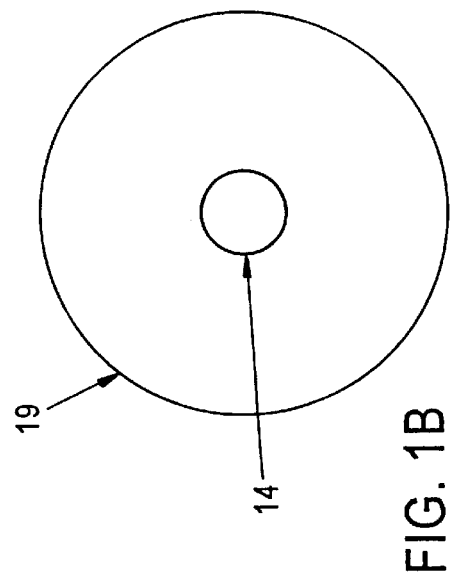
FIG. 1B is an end view of the conical deflector used in the system of FIG. 1A.

FIG. 1A depicts a first embodiment of the invention. In this embodiment, a lighting system 10 includes an optical fiber bundle 11, a light source 12 and a light deflector 13. Although there could be a single fiber, the bundle 11 preferably includes a plurality of optical fibers carrying light from a lamp or other remote source 12 to the deflector 13. The deflector 13 has the shape of a cone, in this embodiment, with a circular lateral cross section. The cone has two circular openings 14 and 19. FIG. 1B is an end view of the cone, looking into the opening in the large end 19 showing the circular cross-section represented by the circular end openings. Although not shown, the large opening may be covered with a transparent plate or lens, to prevent entry of dirt or debris into the cone.

The cone tapers from the large end opening 19 to the narrow end opening 14, which is adjacent to the distal end 15 of the fiber bundle 11. Stated another way, the wall(s) of the cone expand along the length of the cone from the small end 14 to the large end 19, at an angle with respect to the longitudinal axis of the cone. In this embodiment, the wall(s) of the cone 17 are straight and extend at a single angle over the entire longitudinal length of the cone. The entire area of inner surface 17 is reflective. At least a portion of the reflective surface 17 is specular.

In several preferred embodiments, such as that shown in FIGS. 1A and 1B, the shape of the cone and/or the shape of the reflective surface within the deflector may be referred to as a truncated "right-circular cone." As noted above, the cone 17 has a circular cross-section perpendicular to the axis of the cone at all points along the lengthwise dimension of the cone. The circular cone 17 expands at a constant angle relative to its axis along the length of the wall of the cone, such that when viewed in longitudinal cross-section (FIG. 1), the cone 17 appears to have straight walls at an angle with respect to the central axis. The cone is truncated, in that it does not come to an actual point at the narrow end.

A specular, reflective material reflects light in such a manner that the angle of reflection of the redirected light with respect to the reflective surface has the same magnitude as the angle of incidence of the incoming light relative to that surface. However, the term specular covers a range of materials and reflectivities. A highly specular material has a mirror-like finish, for example formed by silver and glass coatings or formed of highly polished aluminum. A quasi-specular material will not reflect as efficiently as a highly specular material and may cause some diffusion of the light. However, most of the reflected light will satisfy the principle that angle of reflection equals angle of incidence. As an example, a quasi-specular surface may be formed of lightly polished aluminum.

In the system of FIG. 1, for example, the specular surface 17 may be quasi-specular or highly specular. For purposes of further discussion of FIG. 1, it is assumed that the entire inner surface 17 of the conical deflector 13 has a uniform specular reflectivity.

The proximal end of the optical fiber bundle 11 receives light from the source 12. The fiber bundle 11 carries or transmits the light from the source 12 to the distal end 15 of the bundle. The distal end 15 of the optical fiber bundle 15 is optically coupled to the opening 14 in the narrow end of the cone. The light emerges from the distal end 15 of the bundle 11 into the interior of the conical deflector 13. For this purpose, the narrow end opening 14 of the conical light deflector 13 typically surrounds the distal end 15 of the fiber bundle 11. As such, all of the light emerging from the end 15 of the fiber bundle 11 passes into the interior of the conical deflector 13.

FIG. 1A also provides a simplified illustration of several of the paths of light photons emitted from the fiber bundle 11. As shown at a, some portion of the emitted light emerges from the end of the bundle directly toward the desired field of view (FOV), typically on or about the axis of the deflector cone 13. Such light illuminates surfaces within that field without any reflection from the interior surface 17 of the deflector 13.

Other portions of the emitted light emerge from the distal end 15 of the bundle 11 in directions that would not illuminate objects within the desired field of view FOV. Such light exhibits an initial angle relative to the axis of the cone 13 which is greater than the conical angle of the deflector 13. Without the deflector 13, such light would serve no useful purpose and would decrease the efficiency of the illumination provided in the desired field of view by the lighting system 10. In accord with the invention, however, the specular reflective nature of a portion or all of the surface 17 of the conical deflector 13 serves to direct such light back into the field of view.

For example, as shown by the path b, a photon emerging from the distal end 15 of the fiber bundle 11 in a direction substantially off-the-axis of the fibers and the cone might strike one side of the inner surface 17 of the conical deflector 13. The reflective inner surface would redirect such light back into the desired field of view of the system 10, and in some cases, in a direction somewhat closer to an angle paralleling the axis of the fiber and the cone. The critical feature here is that such redirected light would remain within and illuminate the desired field of view (FOV). The path b shows a single such reflection to redirect the light.

As another example, as shown by the path c, a photon emerging from the distal end 15 of the fiber bundle 11 in a direction still further off-the-axis of the fibers might strike one side of the inner surface 17 of the conical deflector 13. The reflective inner surface would redirect such light back, but in this case, the light actually reflects off the opposite side of the conical deflector 13. Such photons reflect two times (c) or more times (d) off the reflective inner surface 17 until they too are redirected back in a direction within the angle desired for the field of view (FOV). The redirected light would remain within the field of view (FOV) and, at a specified distance, would illuminate a desired footprint, e.g. on a planar surface perpendicular to the axis of the cone 17.

In this manner, most if not all of the light reflected by the surface 17 will at least achieve an angle that keeps the light within the field of view.

The angle of the wall(s) of the conical deflector 13 substantially corresponds to the angle of the desired field of view (FOV). For example, for a 15° field of view, the reflective inner surface 17 of the deflector 13 would have an angle of approximately 15° with respect to the longitudinal axis of the cone. For a 24° field of view, the conical angle would be approximately 24°; and for a 40° field of view the conical angle would be approximately 40°.

The percentage of light leaving the fiber bundle 11 and subsequently emitted from the conical deflector 13 to illuminate the desired field of view (FOV) depends on the length of the conical light deflector 13, the diameter of the fiber optic bundle 11, the size and location of the specular area 17 on the surface within the cone and the degree of specular reflectivity or lack of diffuseness of that surface area. The length of the deflector 13 preferably is chosen such that substantially all of the light emerging from the distal end 15 of the fiber bundle 11 is kept within the desired field of view (FOV). Presently, proposed embodiments for use with an optical fiber bundle, for example, have an 80 mm length.

Figure 2:
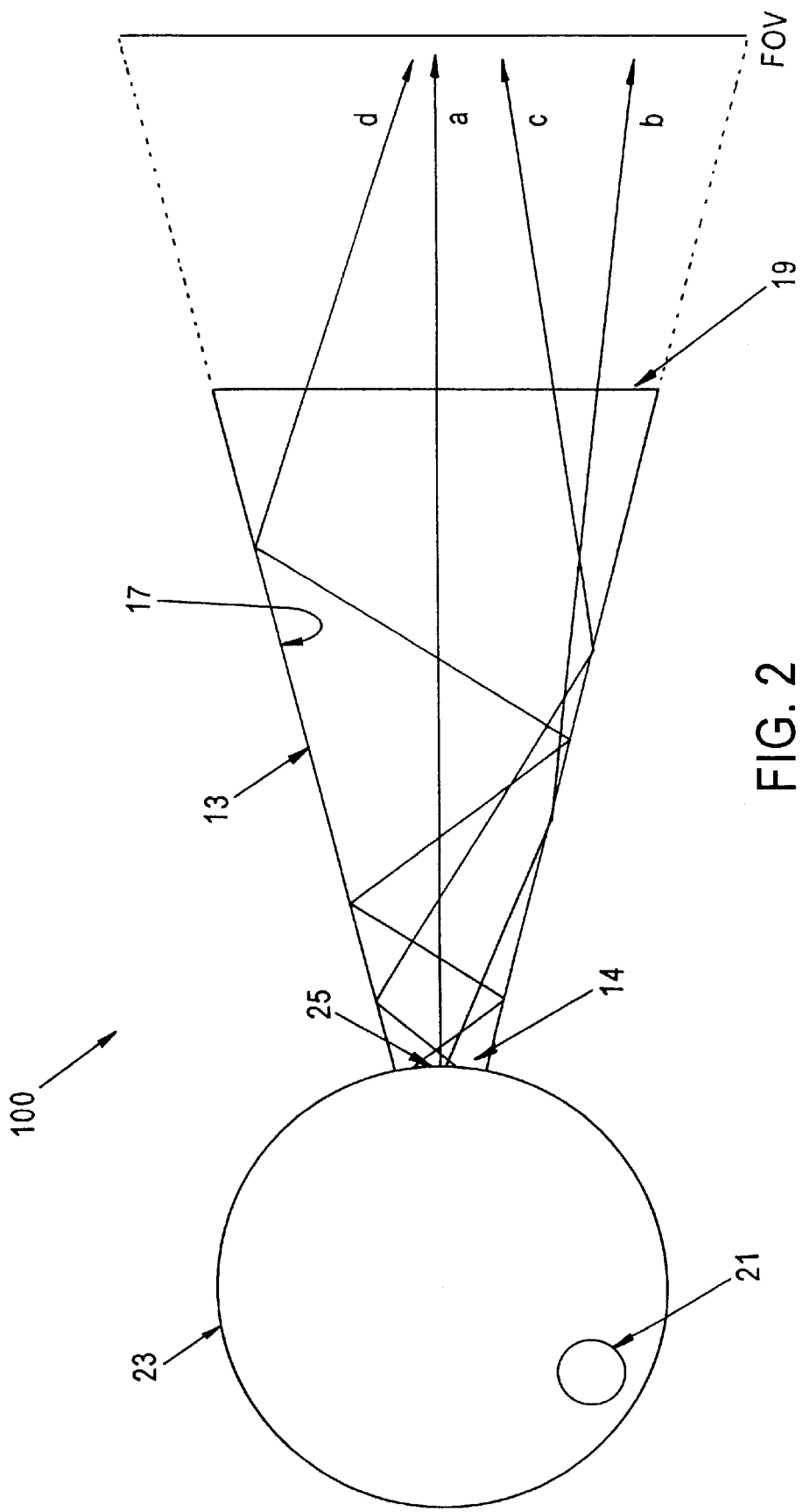
FIG. 2 is a simplified cross-sectional illustration of a conical deflector utilized to uniformly direct the light from an integrating cavity into a narrow field of view.

The conical light deflector 13 also may be used with an optical integrating cavity, as illustrated in FIG. 2. The conical deflector and the light paths through that deflector illustrated in FIG. 2 are generally similar to those shown in FIG. 1, and like reference characters are used for convenience. In the exemplary embodiment shown in the drawing, the integrating cavity 23 takes the shape of a sphere, although other integrating cavity shapes may be used. Preferably the inner spherical surface is diffusely reflective.

In this implementation, a source 21 emits light into the cavity 23. The source 21 may be a light bulb or lamp within the cavity, or the source 21 may be the distal end of a light transmitting fiber coupled from a source (recall FIG. 1A) through an opening in the wall of the cavity 23. The narrow end 14 of the conical light deflector 13 is coupled to an opening 25 in a wall of the integrating cavity 23.

The spherical cavity 23 reflects and directs the light emitted by the source 21 through the one opening 25 in the wall of the cavity. Thus, substantially all of the light from the source 21 emerges into the cone 13 through its narrow opening 14. The specular inner surface 17 of the conical deflector 13 directs the light, in the manner described above, to illuminate the desired field of view (FOV).

The conical light deflector of the present invention may be used in a variety of lighting systems. At least one initial application is for runway lighting. In such an application, the system of the invention may be implemented with a relatively low profile, yet the system provides highly efficient lighting with a uniform intensity distribution over the desired field of view. As such, when a pilot sees the light from within the field of view of each deflector, the pilot senses substantially the same light intensity. Because the system emits relatively little light outside the field of view, the system produces minimal glare for observers in other positions.

Figure 3:
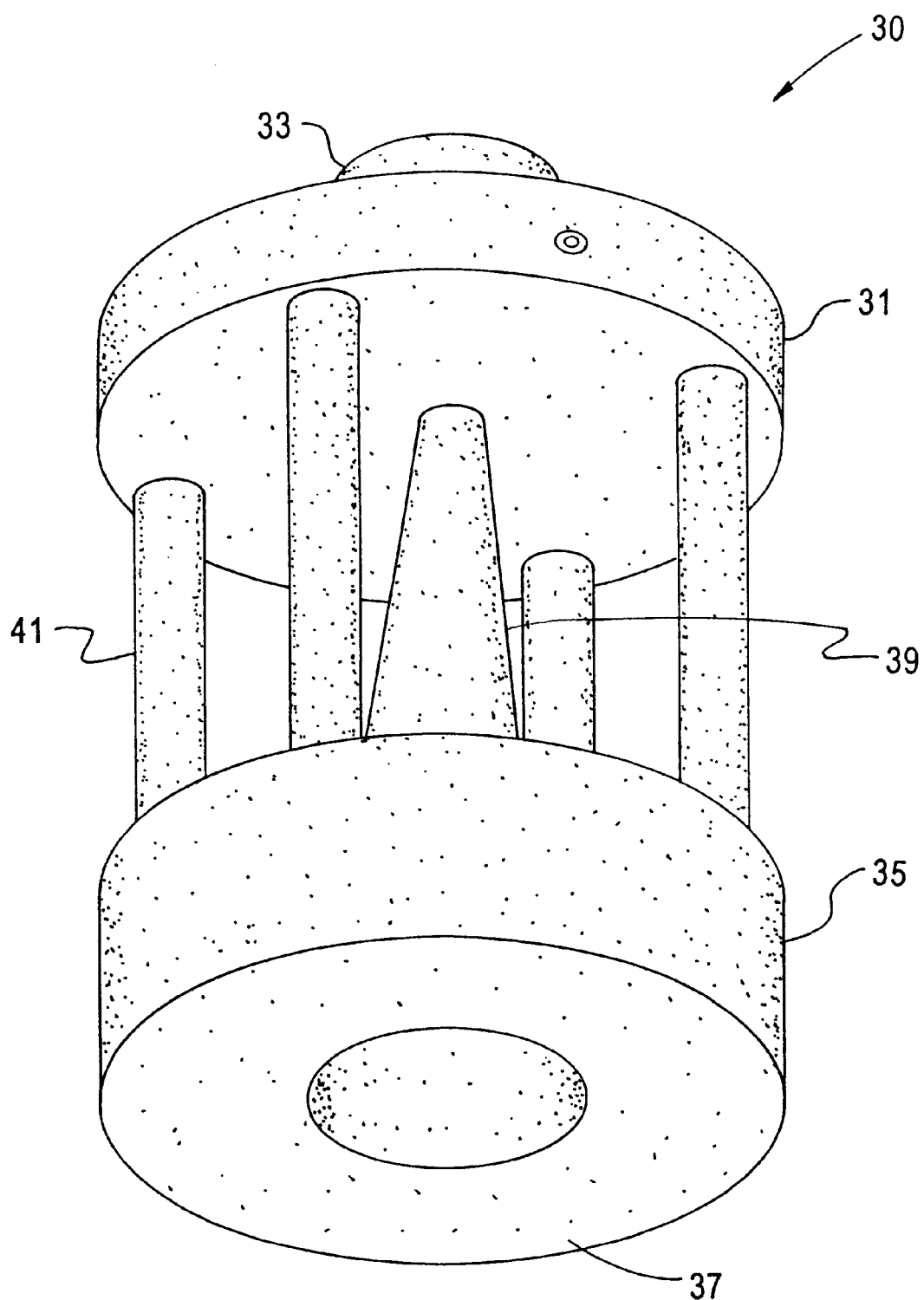
FIG. 3 is an isometric view of an optic incorporating a conical light deflector in accord with the invention.

FIGS. 3 to 5 depict a prototype of an optic 30 incorporating a conical light deflector in accord with the invention. This optic is designed for use with a fiber optic bundle, which provides the light to the optic. The optic 30 efficiently illuminates a narrow field of view and provides a relatively uniform intensity distribution over the field of view, in the manner discussed above relative to the embodiment of FIG. 1.

FIG. 3 is an isometric illustration of the assembled optic 30. As shown, the optic 30 includes a fiber mount plate 31. The plate 31 serves as a coupler for mechanically securing the distal end of a fiber bundle in a position to optically couple light from the bundle into the interior of the conical deflector. The plate 31 has a collar 33, and the distal end of the fiber bundle is inserted in and fastened to the collar 33.

The optic 30 also includes a cone retainer plate 35. The cone retainer plate 35 has a tapered passage 37 therethrough. The large end of the conical deflector 39 rests in the passage 37 and is flush with the end of the plate 35. The passage is dimensioned and tapers at such an angle as to closely conform to the outside surface of the large end of the conical deflector 39.

The narrow end of the deflector cone 39 fits into an opening in the fiber mount plate 31. Four rods 41 connect the fiber mount plate 31 to the cone retainer plate 35 in such a manner as to hold the cone 39 in the position shown between the fiber mount plate 31 and the cone retainer plate 35. In the prototype version, the plates 31 and 35 are aluminum, although a variety of other known materials could be used.

Figure 4B:
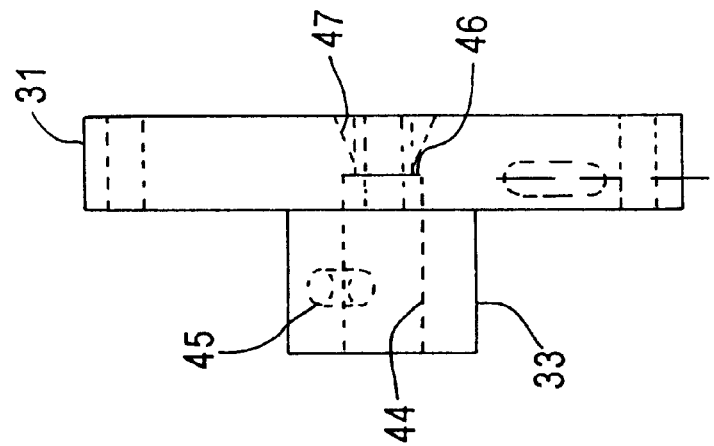
FIGS. 4A and 4B are end and side elevational views respectively of the fiber mount plate of the optic of FIG. 3.
Figure 4A:
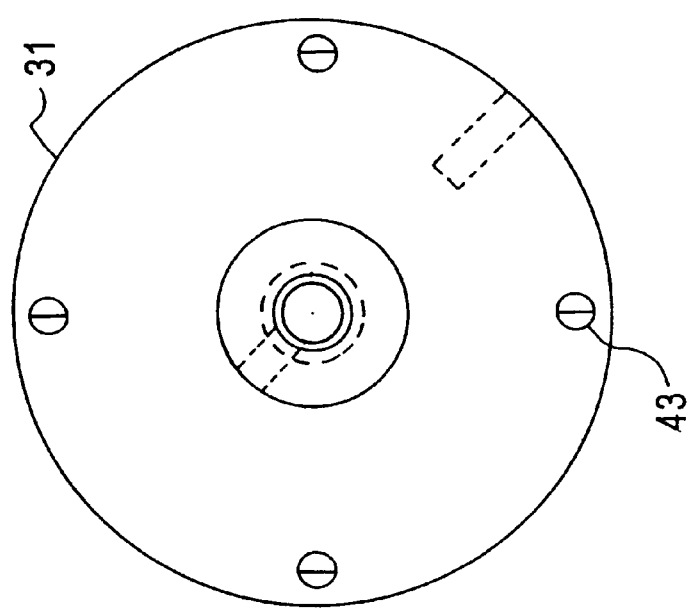

FIGS. 4A and 4B provide more detailed illustrations of the fiber mount plate 31. As shown in the end view of FIG. 4A, the plate 31 includes four tapped holes 43 for connection of the rods 41 (FIG. 3).

As shown in FIG. 4B, the collar 33 includes a central, axial passage 44. The diameter of the passage 44 corresponds closely to the outside diameter of the fiber bundle. A fastener (not shown) connects through a bore 45, to retain the distal end of the fiber bundle in the passage 44. The passage 44 ends at a shoulder 46 that is slightly smaller in diameter than the passage 44. The shoulder serves as a stop, to accurately position the distal end of the fiber bundle.

The passage 44 provides a through-connection or coupling to a tapered opening 47. The dimension and taper of the opening 47 correspond to those of the outside of the cone 39. The narrow end of the cone 39 (FIG. 3) is positioned within the opening 47, when the optic 30 is assembled. The positioning of a fiber bundle in the passage 44 together with the location of the narrow end of the cone 39 in the opening 47 provides an efficient optical coupling of light emerging from the fiber bundle into the interior of the conical deflector.

FIG. 5A is an end view the cone retainer plate 35 (from the side facing the fiber mount plate 31). As shown in that view, the plate 35 includes four holes 51 for passage and connection of the rods 41 (FIG. 3).

FIG. 5B shows the tapered passage 37 therethrough, in dotted line form. The large end of the cone 39 rests in the passage 37 and is substantially flush with the end of the plate 35. The passage 37 is dimensioned and tapers at such an angle as to closely conform to the outside surface of the large end of the conical deflector 39.

The relative dimensions and taper angles of the passages 37 and 47 shown in the drawings are exemplary only. The actual dimensions, and taper angles conform to those of the conical deflector. Different optics, designed for different fields of view, utilize conical deflectors having correspondingly different conical angles and matching passages 37 and 47.

In the presently preferred embodiment, the conical deflector 39 exhibits a highly specular reflectivity over its entire interior surface. The inner surface may be highly polished aluminum. Alternatively, the cone may comprise a rigid substrate, typically an injection molded plastic, that is silvered and glass coated or otherwise treated to produce a mirrored finish on the interior surface.

As discussed above, the interior surface of the conical deflector includes a specular reflective region. This region may include the entire interior surface of the cone, and the earlier views show essentially a continuous surface characteristic, intended to represent specular reflectivity that is substantially uniform over the entire surface.

However, light emerging from the distal end of an optical fiber or a fiber bundle may not have an adequately uniform power distribution. There may also be applications of the system with the integrating cavity where some tailoring of the distribution is desirable. In accord with another aspect of the invention, to tailor and/or further improve the uniformity of the distribution of the light over the field of view of the system, an area of one specular reflectivity may be selected and combined with one or more areas of other reflective characteristics on the interior of the cone. The location and dimensions of regions of various reflectivity actually may be selected to produce a desired distribution of the light over the field of illumination or view, although preferably the resulting light distribution is uniform.

For example, the conical deflector 63 shown in FIG. 6 has two regions 67A and 67B of different reflectivity. The portion 67A of the inner surface of the cone 63 extending lengthwise from the small end of the cone to a point near the middle of the cone may have a quasi specular reflectivity. Alternatively, the portion 67A may have a diffuse reflective characteristic. The portion 67B of inner surface of the cone 63 extending lengthwise from approximately the middle of the cone to the large end of the cone may have a highly specular reflectivity. Alternatively, the portion 67A may be highly specular, and the portion 67B may be diffuse or quasi-specular.

Figure 7B:
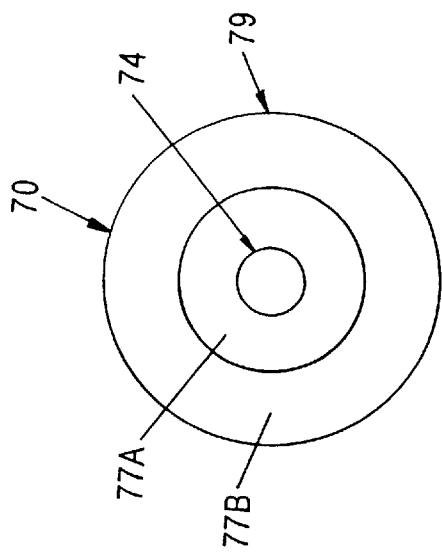
FIGS. 7A and 7B are cross-section and end views of an alternate embodiment of the deflector, having a compound cone structure.
Figure 7A:
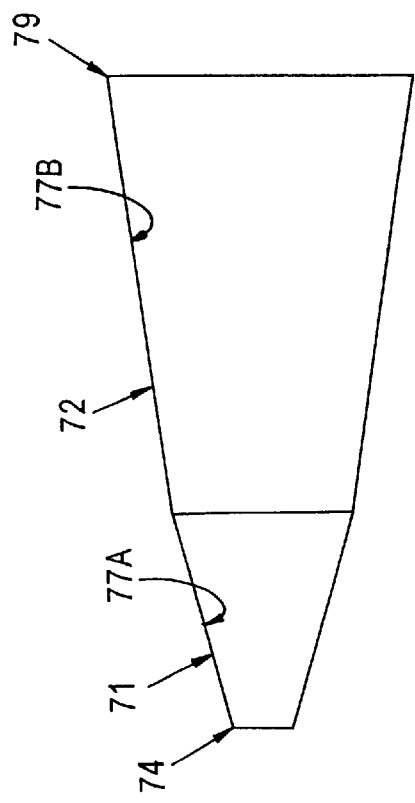

FIGS. 7A and 7B depict another embodiment of the cone of the deflector. The embodiments of FIGS. 1 and 2 had continuous conical walls, expanding from the small end at a predetermined angle with respect to the axis of the cone. By contrast, the embodiment of FIGS. 7A, 7B utilizes a compound cone structure.

In this embodiment, the cone 70 comprises two sections 71 and 72. The first section is adjacent to the small end 74 of the cone. In the first section 71, the interior walls expand outward from the small end 74 through at a first angle with respect to the longitudinal axis of the cone (see FIG. 7A). In the illustrated example, the first section 71 comprises approximately one-third the overall length of the cone 70, although longer or shorter first sections may be used. The second section 72 forms the remainder of the cone 70. In the second section 72, the interior walls expand outward as the section extends toward the large end 79 of the cone 70, but in this section the angle with respect to the longitudinal axis of the cone is different from the angle in the first section. As illustrated, the angle in the first section 71 is larger, relative to the axis, than is the angle of the walls of the second section 72.

The compound cone structure 70 exhibits two different reflective regions 77A, 77B on the interior walls of the sections 71, 72 which would be visible from the field of view (see FIG. 7B). To an observer, there would appear to be a surface discontinuity at the transition between the two sections, shown as a line in FIG. 7A and as a circle in FIG. 7B. At least one of the regions has a specular reflectivity (quasi or highly specular), preferably the section 77B. The other region 77A may have the same specular reflectivity, or that region of the inner walls may have a diffuse or different degree of specular reflectivity in a manner similar to the embodiment of FIG. 6.

Figure 8B:
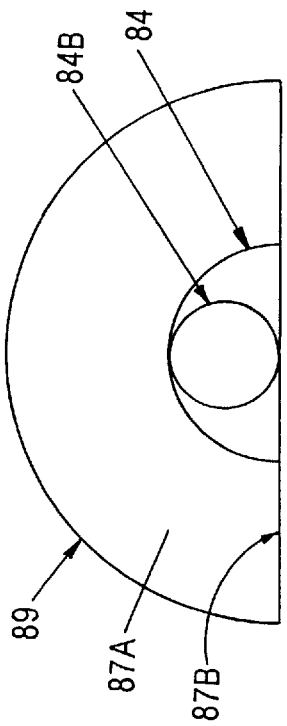
FIGS. 8A and 8B are cross-section and end views of an alternate embodiment of the deflector, having a semicircular cross-section.
Figure 8A:
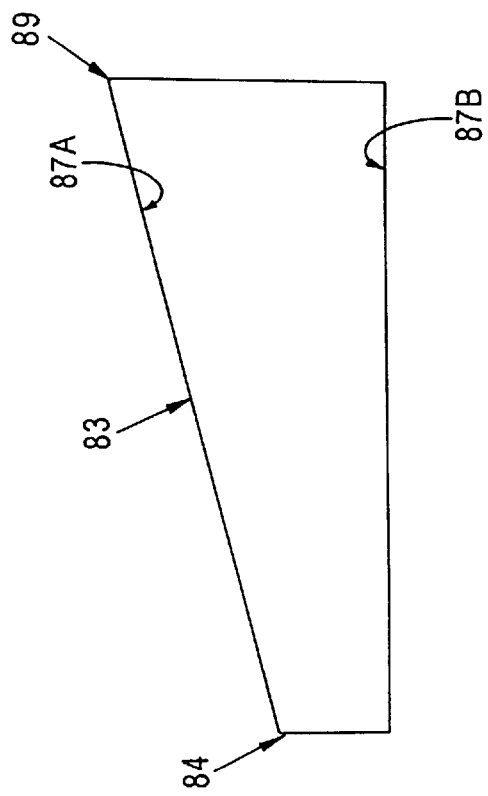

FIGS. 8A and 8B depict another embodiment of the cone of the deflector, which has a semi-circular cross-section with a flat wall across the diameter of the semicircular cone. The ends 84, 89 both appear as half-circles with a flat side (FIG. 8B). The small end 84 forms a flat, half-circular end-wall, with an opening 84' cut through for coupling to the optical fiber or the integrating cavity. The entire end 84 may form the opening, the opening 84' may have the same shape as the end wall but be slightly smaller than that wall, or as shown in FIG. 8B, the opening 84' may be circular to facilitate coupling to the end of an optical fiber.

The interior surfaces of the deflector of FIGS. 8A, 8B include the inner surface 87A of the semicircular cone 83 and the inner surface 87B of the flat wall. As shown, these surfaces have a continuous specular reflective characteristic over their entire surface areas. As in the earlier embodiments, however, sections of the surfaces with specular reflectivity may be combined with other sections having diffuse reflectivity or a different degree of specular reflectivity.

Figure 9B:
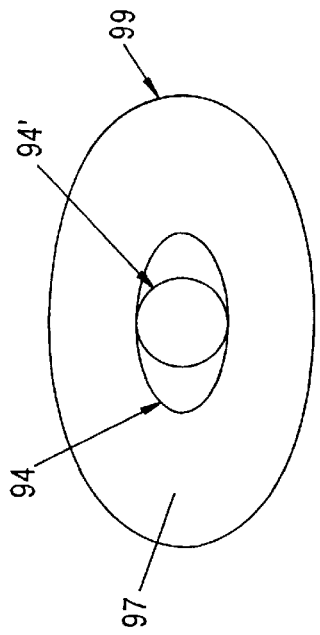
FIGS. 9A and 9B are cross-section and end views of an alternate embodiment of the deflector, having an oval or elliptical cross-section.
Figure 9A:
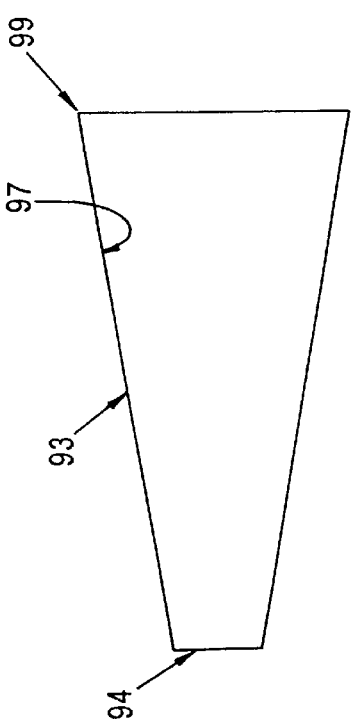

FIGS. 9A and 9B depict an embodiment of the cone of the deflector, which has a oval or elliptical cross-section. The ends 94, 99 appear as ovals in the end view of FIG. 9B. The small end 94 forms a flat, oval or elliptical end-wall, with an opening 94' cut through for coupling to the optical fiber or the integrating cavity. The entire end 94 may be open, opening 94' may have the same shape but smaller dimensions than the end wall, or as shown in FIG. 9B, the opening 94' may be circular to facilitate coupling to the end of an optical fiber.

The interior surface of the deflector cone 93 has a continuous specular reflective characteristic over its entire surface area. As in the earlier embodiments, however, sections of the inner wall surface with specular reflectivity may be combined with other sections having different reflectivity.

Figure 10B:
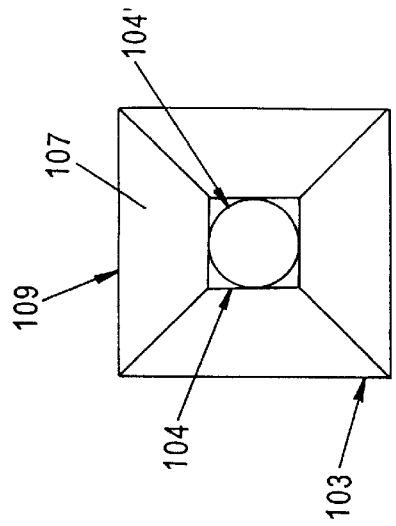
FIGS. 10A and 10B are cross-section and end views of an alternate embodiment of the deflector, having a rectangular (e.g. square) cross-section.
Figure 10A:
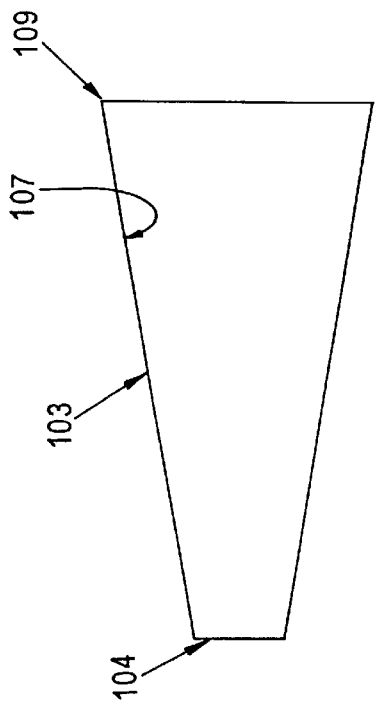

FIGS. 10A and 10B depict an embodiment of the cone of the deflector, which has a rectangular cross-section. In the example, the rectangular cross-section actually is square. The end 104 may have a square opening, the same size as or smaller than the size of the end 104, for coupling to a cylindrical integrating cavity. As shown, however, the small end 104 forms a flat, square end-wall, with an circular opening 104' for coupling to the end of an optical fiber or to a spherical integrating cavity.

The interior surfaces 107 of the four walls of the deflector cone 103 have a continuous specular reflective characteristic over their entire surface areas. As in the earlier embodiments, however, sections of the inner wall surfaces with specular reflectivity may be combined with other sections having different reflectivity.

Figure 11A:
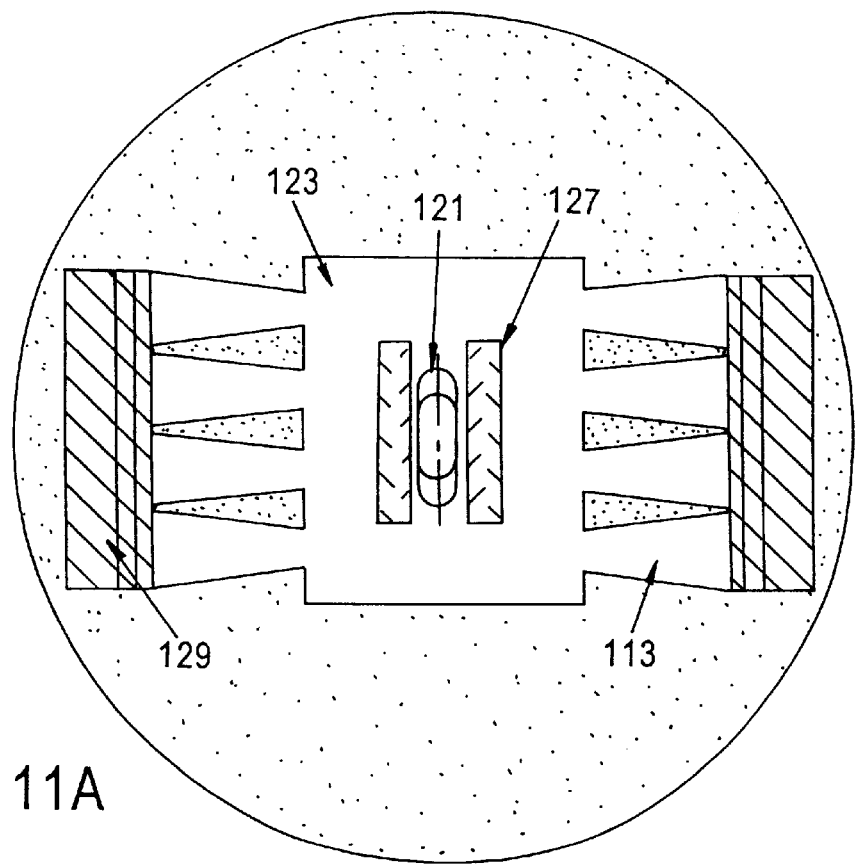
FIGS. 11A and 11B are top and front cross-sectional views of another embodiment of the invention, which utilizes a cylindrical cavity in combination with a plurality of conical deflectors.
Figure 11B:
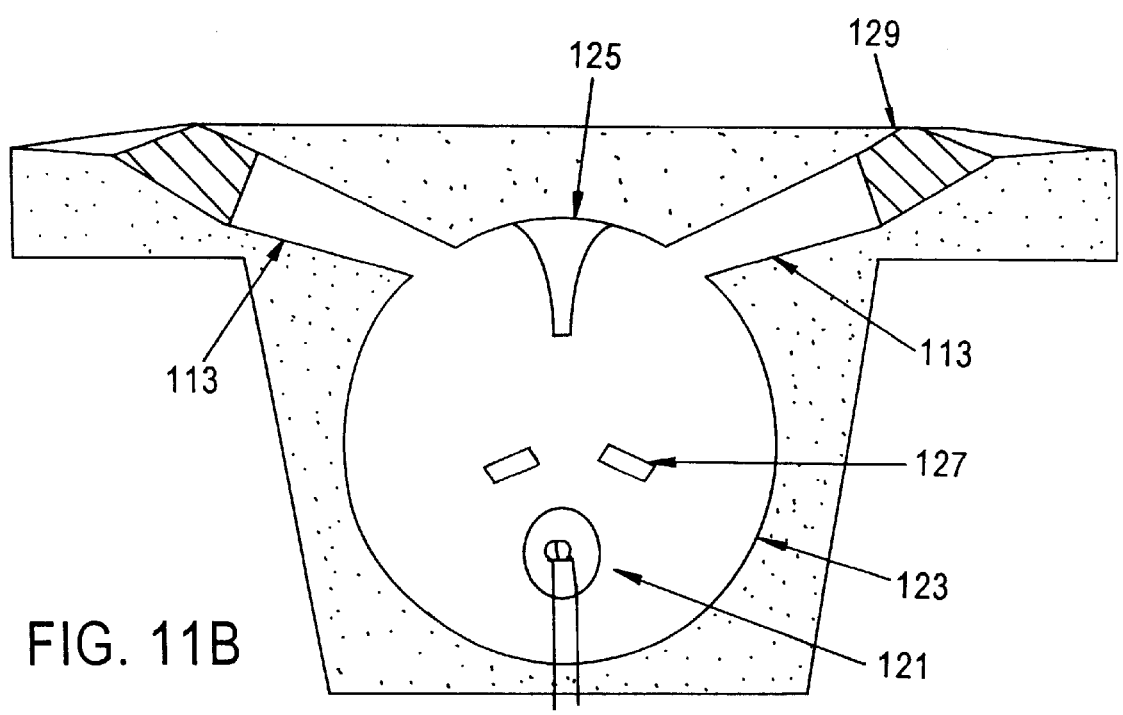

FIGS. 11A and 11B are top and front cross-sectional views of another embodiment of the invention. This embodiment utilizes a cylindrical integrating cavity 123, shown as a rectangle in the top view of FIG. 11A, and shown as a circular cross-section in the front view. The inner surfaces of the cylindrical cavity 123 are diffusely reflective. A source, such as lamp 121, emits light into the cavity 23.

The present invention may work with multiple conical deflectors coupled to one integrating cavity. The deflectors may be arranged in a variety of patterns to connect to the cavity. To illustrate this point, the embodiment of FIGS. 11A, 11B includes two rows of deflectors 113. Each row includes four conical deflectors. In the illustrated embodiment, the entire inner surface of each of the conical deflectors 113 has a highly specular reflective characteristic, although combinations of highly specular, quasi-specular and diffuse materials may be used on the inner surfaces of these cones.

As illustrated, the cones of the deflectors have substantially the same shape when viewed in cross-section from the top and the side. As such, the cones may be circular in cross-section similar to FIG. 1A or square in cross-section similar to FIG. 10B. However, as outlined above, certain applications may warrant use of other conical deflector shapes.

The small ends of the cones in the two rows connect to two parallel rows of matching openings in the cylindrical wall of the cavity 123. A diffusely reflective baffle 125, is attached to the cylindrical wall of the cavity 123. The system of FIGS. 11A and 11B also may include two diffuse baffles 127 positioned at angles above the light source 121 as shown. The baffles 127 help to diffuse the light from the source 121 throughout the cavity 121, and the baffle 125 helps to efficiently direct light from the cavity 123 through the openings into the specular interiors of the cones 113. A prism 129 covers the four large end openings of the cones 113 in each row of cones.

The above discussed embodiments represent examples of lighting systems using conical deflectors within the scope of the invention. Those skilled in the art will recognize that the invention admits of a range of modifications. For example, the cones in the above discussed embodiments have been straight cones, extending along a straight axis. Some applications, particularly requiring a low profile, may utilize curved or bent cone structures. For example, a bent cone would extend along a first axis at one angle, and then extend from the bend along a second angle toward the desired field of view.

Appendix 1 of the above incorporated provisional application shows modeling results, energy maps and schematic shape diagrams for three initial implementations of optics incorporating the conical light deflector, for use with an optical fiber bundle as the source of light for illumination of desired fields of view having three different angles of view. Appendix 2 of the above incorporated provisional application is a presentation detailing the construction and testing of those optics.

While the foregoing has described what are considered to be preferred embodiments of the invention, it is understood that various modifications may be made therein and that the invention may be implemented in various forms and embodiments, and that it may be applied in numerous applications, only some of which have been described herein.

What is claimed is:

1. A lighting system, comprising:
   a source of light;
   an optical fiber bundle having a proximal end coupled to receive the light from the source so that the fiber bundle carries the light from its proximal end to a distal end;
   a deflector having an interior wall forming a truncated right-circular cone expanding from a small end adjacent one end of the deflector to a large end adjacent an opposite end of the deflector at an angle with respect to the longitudinal axis of the deflector, the small end of the cone being optically coupled to the distal end of the optical fiber bundle such that the bundle transmits the light into the interior of the cone; and
   a specular reflective surface on a substantial portion of the interior wall of the deflector, such that light emerges from the large end of the cone within a field of view defined by the angle of the wall of the cone and with a desired intensity distribution over the field of view.

2. A lighting system as in claim 1, further comprising a mechanical connector securing the distal end of the optical fiber bundle adjacent to the small end of the conical deflector, so as to optically couple light emerging from the distal end of the fiber bundle into the interior of the conical deflector.

3. A lighting system, further comprising:
   source of light;
   an optical fiber bundle having a proximal end coupled to receive the light from the source so that the fiber bundle carries the light from its proximal end to a distal end;
   a conical deflector, interior walls of which expand from a small end of the deflector to a large end of the deflector at an angle with respect to the longitudinal axis of the deflector the small end of the conical deflector being optically coupled to the distal end of the optical fiber bundle such that the bundle transmits the light into the conical deflector;
   a specular reflective surface on a substantial portion of the interior walls of the conical deflector, such that light emerges from the large end of the conical deflector within a field of view defined by the angle of the walls of the conical deflector and with a desired intensity distribution over the field of view; and
   an optical integrating cavity connected between the distal end of the fiber bundle and the small end of the conical deflector.

4. A lighting system as in claim 3, wherein the conical deflector has a lateral cross-sectional shape selected from the group consisting of circular, rectangular, triangular, oval, elliptical and semicircular.

5. A lighting system, comprising:
   a source of light;
   an optical fiber bundle having a proximal end coupled to receive the light from the source so that the fiber bundle carries the light from its proximal end to a distal end;
   a conical deflector, interior walls of which expand from a small end of the deflector to a large end of the deflector at a predetermined angle with respect to the longitudinal axis of the deflector, the small end of the conical deflector being optically coupled to the distal end of the optical fiber bundle such that the bundle transmits the light into the conical deflector;
   a specular reflective surface on a substantial portion of the interior walls of the conical deflector, such that light emerges from the large end of the conical deflector within a field of view defined by the predetermined anile of the walls of the conical deflector and with a desired intensity distribution over the field of view; and
   another reflective surface on a substantial portion of the interior walls of the conical deflector, said another reflective surface having a reflective characteristic different from the specular reflective surface.

6. A lighting system as in claim 5, wherein said specular reflective surface is highly specular, and another reflective surface has a quasi-specular reflective characteristic.

7. A lighting system as in claim 5, wherein said another reflective surface has a substantially diffuse reflective characteristic.

8. A lighting system as in claim 5, wherein the interior walls expand from the small end of the conical deflector through a first section at a first angle with respect to the longitudinal axis of the conical deflector, and the interior walls expand through a second section to the large end of the conical deflector at a second angle with respect to the longitudinal axis of the conical deflector, the second angle forming the predetermined angle so as to define the field of view.

9. A lighting system, comprising:
a source of light;
an optical integrating cavity receiving the light from the source;
a deflector having an interior wall forming a truncated right-circular cone expanding from a small end adjacent one end of the deflector to a large end adjacent an opposite end of the deflector at an angle with respect to the longitudinal axis of the deflector, the small end of the cone being optically coupled to an opening of the optical integrating cavity such that the cavity transmits light into the interior of the cone; and
a specular reflective surface on a substantial portion of the interior wall of the deflector, such that light emerges from the large end of the cone within a field of view defined by the angle of the wall of the cone and with a desired intensity distribution over the field of view.

10. A lighting system as in claim 5, wherein the conical deflector has a lateral cross-sectional shape selected from the group consisting of circular, rectangular, triangular, oval, elliptical and semi-circular.

11. A lighting system as in claim 9, wherein the optical integrating cavity is spherical.

12. A lighting system as in claim 9, wherein the optical integrating cavity is cylindrical.

13. A lighting system, comprising:
a source of light;
an optical integrating cavity receiving the light from the source;
an optical fiber coupling the source to the optical integrating cavity;
a conical deflector interior walls of which expand from a small end of the deflector to a large end of the deflector at a predetermined angle with respect to the longitudinal axis of the deflector the small end of the conical deflector being optically coupled to an opening of the optical integrating cavity such that the cavity transmits light into the conical deflector; and
a specular reflective surface on a substantial portion of the interior walls of the conical deflector, such that light emerges from the large end of the conical deflector within a field of view defined by the predetermined angle of the walls of the conical deflector and with a desired intensity distribution over the field of view.

14. A lighting system as in claim 9, wherein the source comprises a lighting element positioned within the optical integrating cavity.

15. A lighting system, comprising;
a source of light;
an optical integrating cavity receiving the light from the source;
a conical deflector, interior walls of which expand from a small end of the deflector to a large end of the deflector at a predetermined angle with respect to the longitudinal axis of the deflector, the small end of the conical deflector being optically coupled to an opening of the optical integrating cavity such that the cavity transmits light into the conical deflector;
a specular reflective surface on a substantial portion of the interior walls of the conical deflector, such that light emerges from the large end of the conical deflector within a field of view defined by the predetermined angle of the walls of the conical deflector and with a desired intensity distribution over the field of view; and
another reflective surface on a substantial portion of the interior walls of the conical deflector, said another reflective surface having a reflective characteristic different from the specular reflective surface.

16. A lighting system as in claim 15, wherein the specular reflective surface is highly specular, and said another reflective surface has a quasi-specular reflective characteristic.

17. A lighting system as in claim 15, wherein said another reflective surface has a substantially diffuse reflective characteristic.

18. A lighting system, comprising:
a source of light;
an optical integrating cavity receiving the light from the source;
a conical deflector, interior walls of which expand from a small end of the deflector to a large end of the deflector, the small end of the conical deflector being optically coupled to an opening of the optical integrating cavity such that the cavity transmits light into the conical deflector;
wherein the interior walls expand from the small end of the conical deflector through a first section at a first angle with respect to the longitudinal axis of the conical deflector, and the interior walls expand through a second section to the large end of the conical deflector at a second angle; and
a specular reflective surface on a substantial portion of the interior walls of the conical deflector, such that light emerges from the large end of the conical deflector within a field of view defined by the second angle of the walls of the conical deflector and with a desired intensity distribution over the field of view.

19. A lighting system as in claim 9, further comprising:
another conical deflector having a small end optically coupled to an opening of the optical integrating cavity such that the cavity transmits light into said another conical deflector; and
a specular reflective surface on a substantial portion of the interior walls of said another conical deflector.

20. A lighting system as in claim 1, wherein the angle of the wall of the cone with respect to the longitudinal axis has value selected from the group consisting of 15°, 24° and 40°.

21. A lighting system as in claim 15, wherein the conical deflector has a circular lateral cross-section.

22. A lighting system as in claim 15, wherein the conical deflector has a rectangular lateral cross-section.

23. A lighting system as in claim 15, wherein the conical deflector has a triangular lateral cross-section.

24. A lighting system as in claim 15, wherein the conical deflector has an oval lateral cross-section.

25. A lighting system as in claim 15, wherein the conical deflector has an elliptical lateral cross-section.

26. A lighting system as in claim 15, wherein a lateral cross-section of the conical deflector is semi-circular.

27. A conical light deflector, comprising:
- a rigid cone having interior walls which expand from a small end of the cone to a large end of the cone at a predetermined angle with respect to the longitudinal axis of the cone;
- a coupler attached to the cone for mechanically securing an end of an optical fiber so as to optically couple light emerging from the end of the fiber into the interior of the rigid cone;
- a specular reflective surface on a substantial portion of the interior walls of the cone; and
- another reflective surface on a substantial portion of the interior walls of the cone, said another reflective surface having a reflective characteristic different from the specular reflective surface.

28. A conical light deflector as in claim 27, wherein the specular reflective surface is highly specular, and said another reflective surface has a quasi-specular reflective characteristic.

29. A conical light deflector as in claim 27, wherein said another reflective surface has a substantially diffuse reflective characteristic.

30. A conical light deflector as in claim 27, wherein the interior walls expand from the small end of the cone through a first section at a first angle with respect to the longitudinal axis of the cone, and the interior walls expand through a second section to the large end of the cone at a second angle with respect to the longitudinal axis of the cone, the second angle forming the predetermined angle.

* * * * *